(12) United States Patent
Baghdasarian

(10) Patent No.: US 9,677,602 B1
(45) Date of Patent: Jun. 13, 2017

(54) CAGING MECHANISM FOR A SINGLE- OR MULTI-AXIS POSITIONING MECHANISM

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 619 days.

(21) Appl. No.: 14/089,067

(22) Filed: Nov. 25, 2013

(51) Int. Cl.
   *B25J 17/00* (2006.01)
   *F16C 11/10* (2006.01)

(52) U.S. Cl.
   CPC .................................. *F16C 11/103* (2013.01)

(58) Field of Classification Search
   CPC ............................... F16C 11/103; B25J 17/025
   See application file for complete search history.

(56) References Cited

U.S. PATENT DOCUMENTS

| | | | |
|---|---|---|---|
| 3,849,668 A * | 11/1974 | Dane | B25J 19/063 307/149 |
| 4,566,740 A | 1/1986 | Beau et al. | |
| 4,671,478 A | 6/1987 | Schoenig et al. | |
| 5,303,611 A | 4/1994 | Chi | |
| 5,674,027 A | 10/1997 | Warnaar | |
| 6,923,090 B2 | 8/2005 | Blonski et al. | |
| 7,503,431 B2 | 3/2009 | Sperber et al. | |
| 8,387,921 B2 | 3/2013 | Taylor et al. | |
| 8,436,508 B2 | 5/2013 | Kornbluh et al. | |
| 2013/0340560 A1 * | 12/2013 | Burridge | B25J 17/00 74/490.05 |
| 2016/0004027 A1 | 1/2016 | Marcinuk et al. | |

FOREIGN PATENT DOCUMENTS

FR          2559283 A1 *   8/1985  ............... B25J 3/04

* cited by examiner

*Primary Examiner* — Terence Boes
(74) *Attorney, Agent, or Firm* — Weaver Austin Villeneuve & Sampson LLP

(57) ABSTRACT

Single or multi-axis positioning mechanisms are provided that include a caging mechanism that may be actuated without requiring axial displacement of rotational components of the positioning mechanisms. In some multi-axis positioning mechanism implementations, each rotational axis may have an associated caging mechanism that is transitioned between a caged and uncaged state using a common release device. In some implementations, the release device may be a single-use device. In other implementations, the release device may be capable of re-caging the positioning mechanism after uncaging the positioning mechanism.

24 Claims, 12 Drawing Sheets

CAGING MECHANISM FOR A SINGLE- OR MULTI-AXIS POSITIONING MECHANISM

TECHNICAL FIELD

This invention relates generally to caging mechanisms for single and multiple-axis positioning mechanisms. More specifically, this disclosure relates to positioning mechanisms that may be used on spacecraft to allow booms, antenna reflectors, or other deployable structures to be rotated from a stowed position to a deployed position but that may also be "caged" to prevent rotational movement within the positioning mechanism and potential damage to the rotational bearing mechanisms of such positioning mechanisms during launch environments.

BACKGROUND OF THE INVENTION

The assignee of the present invention manufactures and deploys spacecraft for, inter alia, communications and broadcast services. Spacecraft often include various deployable structures, e.g., solar arrays, antenna reflectors, antenna masts, etc. Such structures may, for example, often be folded flat against a side of the spacecraft during launch and may then subsequently be deployed using, for example, positioning mechanisms when the spacecraft is on-orbit. The positioning mechanisms may also be used, in some cases, to re-orient such deployable structures after the spacecraft is on-orbit.

Due to the fact that the deployable structures are typically only operationally deployed in the zero-gravity environment experienced when the spacecraft is on-orbit, the positioning mechanisms used are preferably designed for lower loads than might be the case were they intended to be operational in a 1 G field. This allows a positioning mechanism to be smaller and to have a reduced weight than it might have in a normal Earth-gravity environment. However, while the spacecraft is generally in a weightless environment once on-orbit, such is not the case during launch. In a launch environment, the spacecraft may experience accelerations of multiple G's that may exert forces on the deployable structures that are beyond the positioning mechanism's ability to withstand and that may result in damage to the bearings, motors, or other components of the positioning mechanism. One current practice to avoid damaging the positioning mechanism for a deployable structure on a spacecraft is to temporarily anchor the deployable structure to the spacecraft body using one or more releasable standoffs, e.g., frangible bolts. Such arrangements may be referred to generically as "caging mechanisms".

The present inventor has recognized that there is a need for positioning mechanisms that may replace one or more such releasable standoffs.

SUMMARY OF INVENTION

The systems, methods and devices of the disclosure each have several innovative aspects, no single one of which is solely responsible for the desirable attributes disclosed herein. One innovative aspect of the subject matter described in this disclosure can be implemented in a variety of ways.

In some implementations, an apparatus that may be used as a positioning mechanism is provided. The apparatus may include a first rotational joint with a first base and a first rotatable part rotationally coupled with the first base via a first rotational bearing mechanism. The first rotatable part may be configured to rotate about a first rotational axis with respect to the first base. The apparatus may further include a first caging mechanism configured to transition from a clamped configuration to an unclamped configuration. The first caging mechanism may be separate from the first rotational bearing mechanism of the first rotational joint, and may, in the clamped configuration, contact the first base and contact the first rotatable part with sufficient radial clamping force to prevent the first rotatable part from rotating with respect to the first base, and may, in the unclamped configuration, not contact the first rotatable part with sufficient clamping force to prevent the first rotatable part from rotating with respect to the first base. The positioning mechanism may be configured to transition between the clamped configuration and the unclamped configuration while keeping the first base and the first rotatable part at a constant offset from one another along the first rotational axis.

In some further implementations, the apparatus may also include a first tensioning mechanism that is configured to maintain the first caging mechanism in the clamped configuration, as well as a release device, the release device configured to releasably maintain the first tensioning mechanism in a first tensioned state to hold the first caging mechanism in the clamped configuration. The first caging mechanism may transition to the unclamped configuration when the first tensioning mechanism is released from the first tensioned state. The first rotatable part may include a substantially radially-symmetric first bearing surface, and the first caging mechanism may include a plurality of first segments arrayed about the first bearing surface such that each first segment has a first interior surface that is offset from the first bearing surface by a first distance when the first caging mechanism is in the unclamped configuration and the first interior surface of each first segment contacts the first bearing surface when the first caging mechanism is in the clamped configuration.

In some further implementations, the apparatus may include a second rotational joint with a second base and a second rotatable part rotationally coupled with the second base via a second rotational bearing mechanism. The second rotatable part may be configured to rotate about a second rotational axis with respect to the second base. The first rotational axis may be parallel to a reference axis that is orthogonal to the second rotational axis. The apparatus may further include a second caging mechanism configured to transition from a clamped configuration to an unclamped configuration. The second caging mechanism may be separate from the second rotational bearing mechanism of the second rotational joint and the second base may be fixed with respect to the first rotatable part. The second caging mechanism, in the clamped configuration, may contact the second base and contact the second rotatable part with sufficient radial clamping force to prevent the second rotatable part from rotating with respect to the second base, and, in the unclamped configuration, may not contact the second rotatable part with sufficient clamping force to prevent the second rotatable part from rotating with respect to the second base. The positioning mechanism may be further configured to transition between the clamped configuration and the unclamped configuration while keeping the second base and the second rotatable part at a constant offset from one another along the second rotational axis.

In some further implementations, the positioning mechanism may be a dual-axis positioning mechanism for use on spacecraft deployable appendage assemblies.

In some further implementations, the apparatus may further include a second tensioning mechanism that is configured to maintain the second caging mechanism in the clamped configuration. The release device may be further configured to releasably maintain the second tensioning mechanism in a second tensioned state as well, and the second caging mechanism may transition to the unclamped configuration when the second tensioning mechanism is released from the second tensioned state. The second rotatable part may include a substantially radially-symmetric second bearing surface, and the second caging mechanism may include a plurality of second segments arrayed about the second bearing surface such that each second segment has a second interior surface that is offset from the second bearing surface by a second distance when the second caging mechanism is in the unclamped configuration.

In some further implementations, the release device may be configured to release both the first tensioning mechanism and the second tensioning mechanism responsive to a common signal.

In some further implementations, the first caging mechanism may include a thin-wall tube with a radial array of slits in one end. The first segments may be located between each pair of adjacent slits. In some such implementations, the thin-wall tube may be fixed with respect to the first base.

In some further implementations, each of the first interior surfaces may have a first cross-sectional profile in a first reference plane coincident with the first rotational axis and intersecting the first interior surface, and the first bearing surface may have a second cross-sectional profile in the first reference plane. The first cross-sectional profile may include a portion that is raised or recessed with respect to a neighboring portion or portions of the first cross-sectional profile, and the second cross-sectional profile may include a portion that is recessed or raised with respect to a neighboring portion or portions of the second cross-sectional profile. The recessed or raised portion, respectively, of the first cross-sectional profile may engage with the (complementary) raised or recessed portion, respectively, of the second cross-sectional profile when the first caging mechanism is in the clamped configuration.

In some further implementations, the first distance may be at least 0.001" to 0.010".

In some further implementations, the first caging mechanism may further include a radial array of cutouts, each cutout located within one of the first segments.

In some further implementations, the first tensioning mechanism may include a first tensioning strap that is wrapped around the first segments and positioned such that the first segments are drawn into contact with the first bearing surface when the first tensioning strap is tightened.

In some further implementations, the first caging mechanism may include a thin-wall tube with a radial array of substantially triangular first cutouts in one end, and the first segments may be located between each pair of adjacent triangular first cutouts.

In some further implementations, the first bearing surface may include a radial array of raised segments offset from the first bearing surface in a radial direction by an amount less than the first distance, and in the clamped configuration, the first segments may each be located between pairs of the raised segments.

In some further implementations, the first caging mechanism may further include a radial array of substantially triangular second cutouts. The triangular second cutouts may be oriented approximately 180° with respect to the first triangular cutouts, and each first triangular cutout may be located within a first segment.

In some further implementations, the first segments may be discrete components that, when radially arrayed, form a substantially tubular structure that surrounds the first bearing surface, and the first interior surfaces may have a radius of curvature that corresponds with a radius of curvature of the first bearing surface.

In some further implementations, the apparatus may further include a substantially radially-symmetric first base bearing surface located on the first base. The first caging mechanism may contact both the first bearing surface and the first base bearing surface when in the clamped configuration.

In some further implementations, the release device may be configured to transition between an open state and a closed state. The release device may draw the first tensioning mechanism into the first tensioned state when transitioned to the closed state, and may release the first tensioning mechanism from the first tensioned state when transitioned to the open state. In some further such implementations, the release device may include an actuator to transition the release device back and forth between the open state and the closed state.

In some further implementations, the first tensioning mechanism and the second tensioning mechanism may be provided in part by a common cable that is wrapped around both the first segments of the first caging mechanism and the second segments of the second caging mechanism. In some such further implementations, the first tensioning mechanism and the second tensioning mechanism may be provided in part by a common cable guide, a first cable anchor point, and a second cable anchor point. The common cable guide may include a contact surface configured to contact a portion of the common cable spanning between the first caging mechanism and the second caging mechanism. A first end of the common cable may be connected to the first cable anchor point, and a second end of the common cable is connected to the second cable anchor point. The release device may be configured to change the distance between the contact surface and at least one of the first cable anchor point and the second cable anchor point.

In some further implementations, the first tensioning mechanism may include a) a first tensioning strap that is wrapped around the first segments and positioned such that the first segments are drawn into contact with the first bearing surface when the first tensioning strap is tightened and b) first tabs that extend away from the first tensioning strap in a substantially radial direction. The second tensioning mechanism may include a) a second tensioning strap that is wrapped around the second segments and positioned such that the second segments are drawn into contact with the second bearing surface when the second tensioning strap is tightened and b) second tabs that extend away from the second tensioning strap in a substantially radial direction. The first tabs and the second tabs may be aligned with one another when the first caging mechanism and the second caging mechanism are both in the clamped configuration. The release device may include at least two bridging links that span between the first tabs and the second tabs. The first tabs and the second tabs may be interposed between the at least two bridging links, and the release device may be configured to draw the first tensioning mechanism into the first tensioned state and the second tensioning mechanism into the second tensioned state by drawing the at least two bridging links together. In some further such implementations, the release device may further include a spring mechanism configured to cause the at least two bridging links to rotate clear of the area where the first tabs travel when the first tensioning mechanism is rotated about the first rotational axis.

In some thin-wall tube implementations, the thin-wall tube may have a wall thickness at the first segments that is between about 0.005" and 0.100".

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

FIGS. 2E' and 2F' are detail views of portions of FIGS. 2E and 2F.

FIG. 3C' depicts a detail view of a portion of FIG. 3C.

FIGS. 2A through 5B are drawn to scale within each Figure, although the Figures may vary in scale from Figure to Figure.

DETAILED DESCRIPTION

Figure 1A:
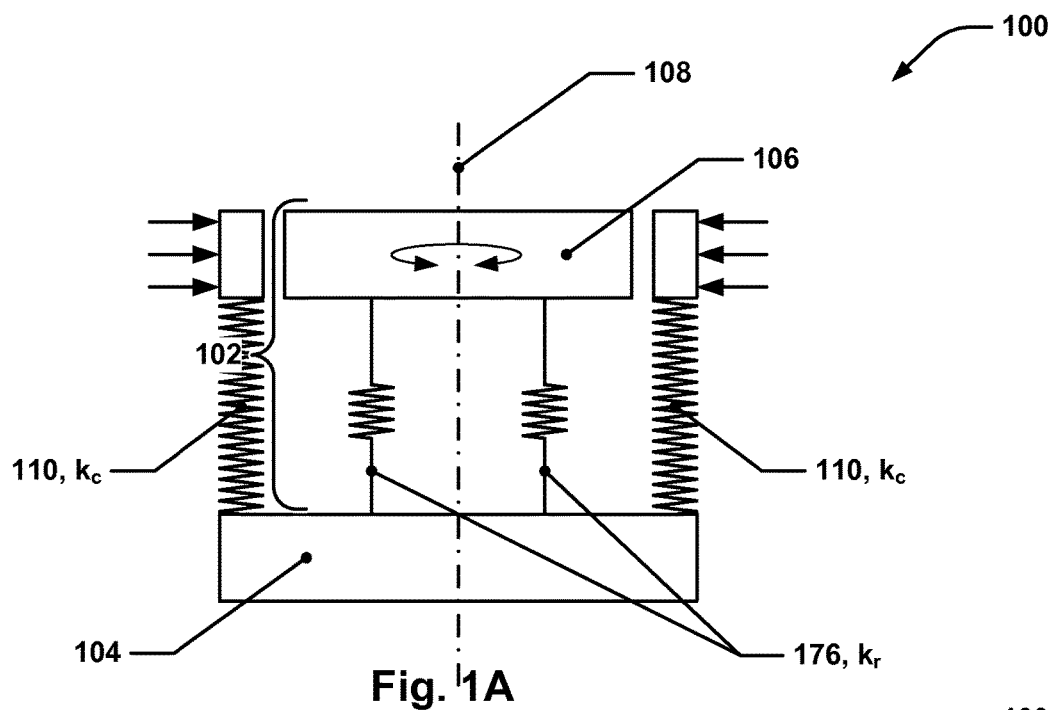
FIGS. 1A and 1B schematically depict an example single-axis positioning mechanism with a caging mechanism.

Specific exemplary embodiments of the invention will now be described with reference to the accompanying drawings. This invention may, however, be implemented in many different forms, and should not be construed as limited to the implementations set forth herein. Rather, these implementations are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "I" is also used as a shorthand notation for "and/or."

As discussed above, positioning mechanisms are commonly used in spacecraft to deploy and orient various deployable structures, e.g., solar collectors, antennas, etc., after the spacecraft is on-orbit. Positioning mechanisms typically feature one or more rotational joints. In the multi-joint case, the rotational joints are typically oriented such that their rotational axes are orthogonal to one another. Non-orthogonal orientations are also, however, possible, although they may present additional complexity during operation.

Positioning mechanisms typically include electric drive motors configured to induce rotational movement in the rotational joints, although some positioning mechanisms may use other drive mechanisms, including drive mechanisms that are passive, e.g., spring drives. Each rotational joint in the positioning mechanism may include a rotational bearing mechanism of some sort, e.g., ball bearings, conical thrust bearings, journal bearings, etc. In some implementations, the rotational bearing mechanism may be part of a drive motor. While positioning mechanisms may feature any number of rotational axes, most are either single- or dual-axis mechanisms. The concepts and techniques discussed herein are generally applicable to single- and multi-axis positioning mechanisms, and, in particular, to single- and dual-axis positioning mechanisms (DAPMs).

The present inventor has realized that positioning mechanisms, including both single and multi-axis positioning mechanisms, may be equipped with a caging mechanism that does not require axial displacement of the rotatable parts of the positioning mechanism with respect to the base parts of the positioning mechanism in order to be entered into a caged state, i.e., the rotatable part and the base of a positioning mechanism may be kept at the same axial offset from one another during caging operations. A "caged" positioning mechanism, as used herein, is a positioning mechanism where the portions of the positioning mechanism that rotate with respect to one another during normal use are locked into a substantially rigid, unmoving configuration by the caging mechanism. As a result, the positioning mechanism, particularly rotational bearing mechanism(s) within the positioning mechanism, may be safely exposed to dynamic environments during, for example, launch, than would be possible in the absence of the caging mechanism. The caging mechanism serves as an alternate load path that is substantially stronger than the load path provided by the rotational bearing mechanism of the rotational joints.

Figure 1B:
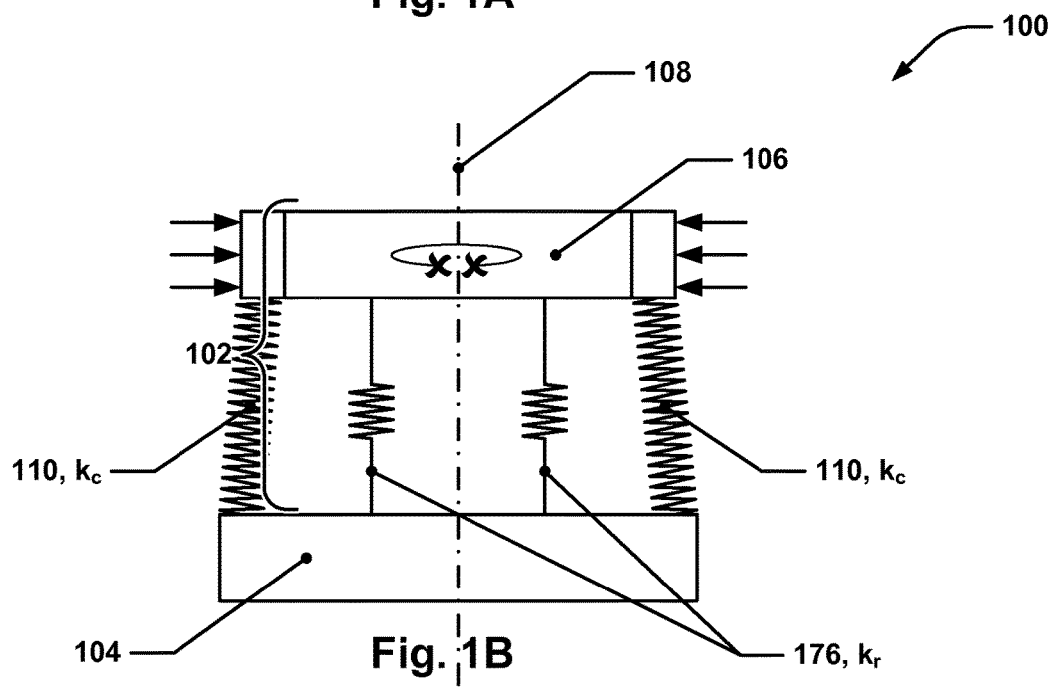

A caging mechanism that does not require axial displacement of the rotatable parts of the positioning mechanism in order to be entered into a caged state is schematically illustrated in FIGS. 1A and 1B for a single-axis positioning mechanism. In FIG. 1A, a first rotational joint 102 is depicted that includes a first base 104 and a first rotatable part 106. The first rotatable part 106 may be configured to rotate about a first rotational axis 108 with respect to the first base 104 via a rotational bearing mechanism 176 (such as may be provided by a motor drive unit and/or other rotational devices), and may thus be described as being rotationally coupled with the first base 104. The rotational bearing mechanism 176 may have a spring constant $k_r$ in the axial direction. Also shown is a first caging mechanism 110, which has portions that may be flexed such that they contact the first rotatable part 106. The first caging mechanism 106 may have a spring constant $k_c$ in the axial direction. The spring constant $k_c$ may be considerably higher than $k_r$, e.g., an order of magnitude higher, or possibly two or three orders of magnitude higher, and the first caging mechanism 110 may be located, on average, a further distance away from the first rotational axis 108 than the rotational bearing mechanism 176, giving the first caging mechanism 110 a much higher stiffness in bending transverse to the first rotational axis 108 than the rotational bearing mechanism 176. The first caging mechanism 110 may have an unclamped configuration (FIG. 1A) and a clamped configuration (FIG. 1B). When an external force is applied to the first caging mechanism 110, portions of the first caging mechanism 110 may be flexed into contact with the first rotatable part 106 (see FIG. 1B). Frictional contact (positive engagement) between the first rotatable part 106 and the first caging mechanism 110 may cause loads transmitted through the first rotational joint 102 to be transmitted through both the rotational bearing mechanism 176 and through the first caging mechanism 110. Due to the greater stiffness in the first caging mechanism 110, the majority of the load transferred through the first rotational joint 102 may be transmitted through the first caging mechanism 110 when the first caging mechanism 110 is in the clamped configuration. When the first caging mechanism 110 is in the unclamped configuration, there may be no load transferred between the first rotatable part 106 and the first base 104 via the first caging mechanism 110, and the first rotational joint 102 may be free to rotate.

Figure 2A:
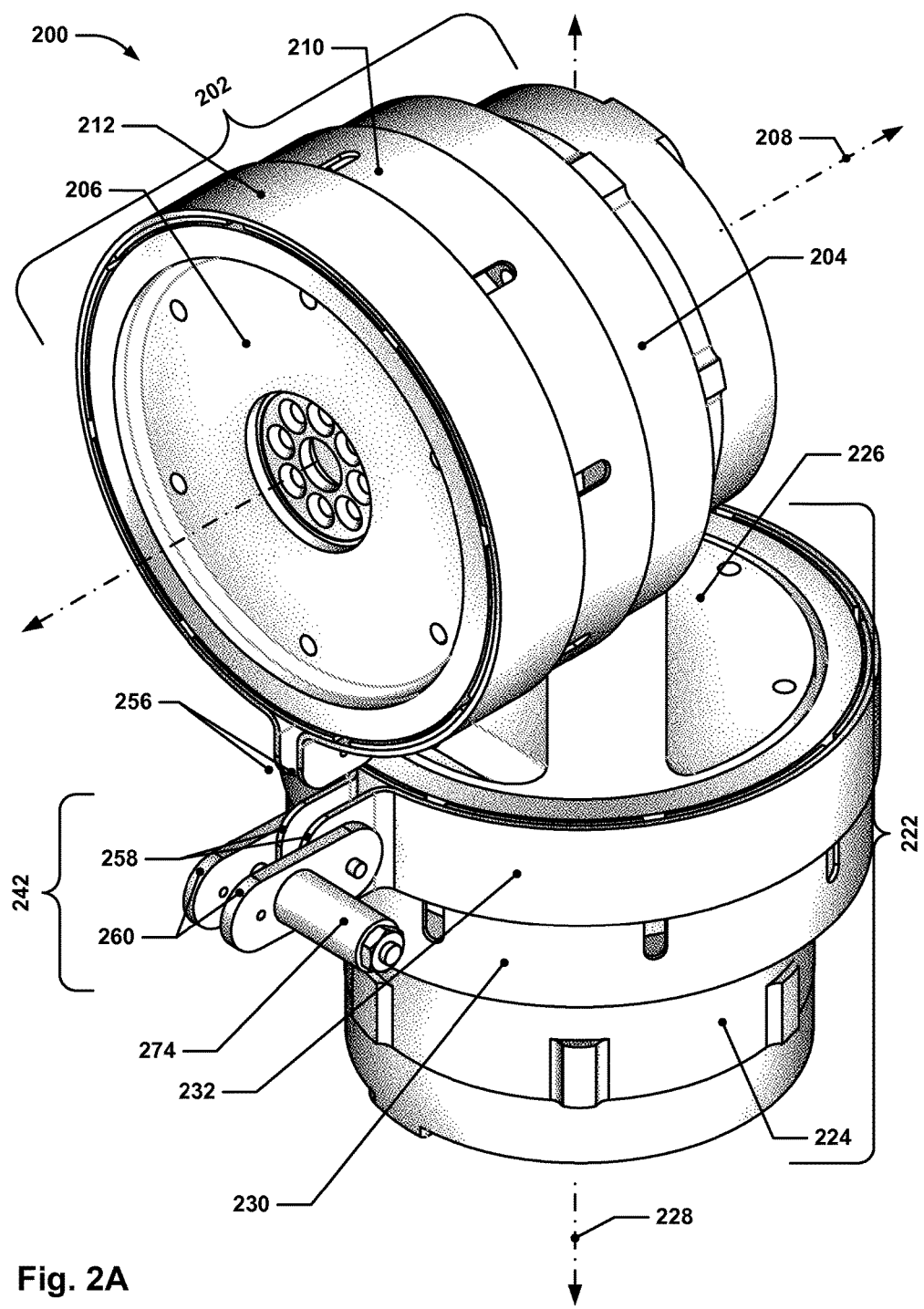
FIG. 2A depicts an isometric view of an example positioning mechanism with a caging mechanism.

FIG. 2A depicts an isometric view of an example positioning mechanism with a caging mechanism. In FIG. 2A, a dual-axis positioning mechanism (DAPM) 200 is shown. The DAPM 200 may include a first rotational joint 202 and a second rotational joint 222. The first rotational joint 202 may include a first base 204 and a first rotatable part 206; the first rotatable part 206 may be configured to rotate about a first rotational axis 208 with respect to the first base 204 (it is to be understood that, throughout this disclosure, when one part is referred to as being a rotatable part and another part is referred to as a base part, such labels are adopted for the ease of discussion—the positions of such parts may be reversed, and either or both types of parts may experience rotation relative to a spacecraft body during use).

The second rotational joint 222 may include a second base 224 and a second rotatable part 226; the second rotatable part 226 may be configured to rotate about a second rotational axis 228 with respect to the second base 224.

The first rotational joint 202 also may include a first caging mechanism 210 (visible in more detail in FIG. 2D) and a first tensioning mechanism 212. Similarly, the second rotational joint 222 also may include a second caging mechanism 230 (also visible in more detail in FIG. 2D) and a second tensioning mechanism 232.

In FIG. 2A, the first tensioning mechanism 212 and the second tensioning mechanism 232 both take the form of band clamps, e.g., Marman clamps, that encircle the first caging mechanism 210 and the second caging mechanism 230, respectively. The first tensioning mechanism 212 may have a pair of first tabs 256 that protrude in a radial direction away from the rest of the first tensioning mechanism 212. Similarly, the second tensioning mechanism 232 may have a pair of second tabs 258 that protrude in a radial direction away from the rest of the second tensioning mechanism 232. The first tensioning mechanism 212 and the second tensioning mechanism 232 may be positioned such that the first tabs 256 and the second tabs 258 are located proximate to one another and substantially in the same plane(s). A pair of bridging links 260 may span between the first tabs 256 and the second tabs 258; the first tabs 256 and the second tabs 258 may be interposed between the bridging links 260. An actuator 274, e.g., a shape-memory alloy frangible bolt, a paraffin actuator, or other device, may be used to draw the bridging links 260 together, which draws the first tabs 256 towards one another and the second tabs 258 towards one another. This causes the first tensioning strap 212 and the second tensioning strap 232 to be cinched against the first caging mechanism 210 and the second caging mechanism 230, respectively. The bridging links 260 and the actuator 274 may, in aggregate, form a release device 242.

Figure 2B:
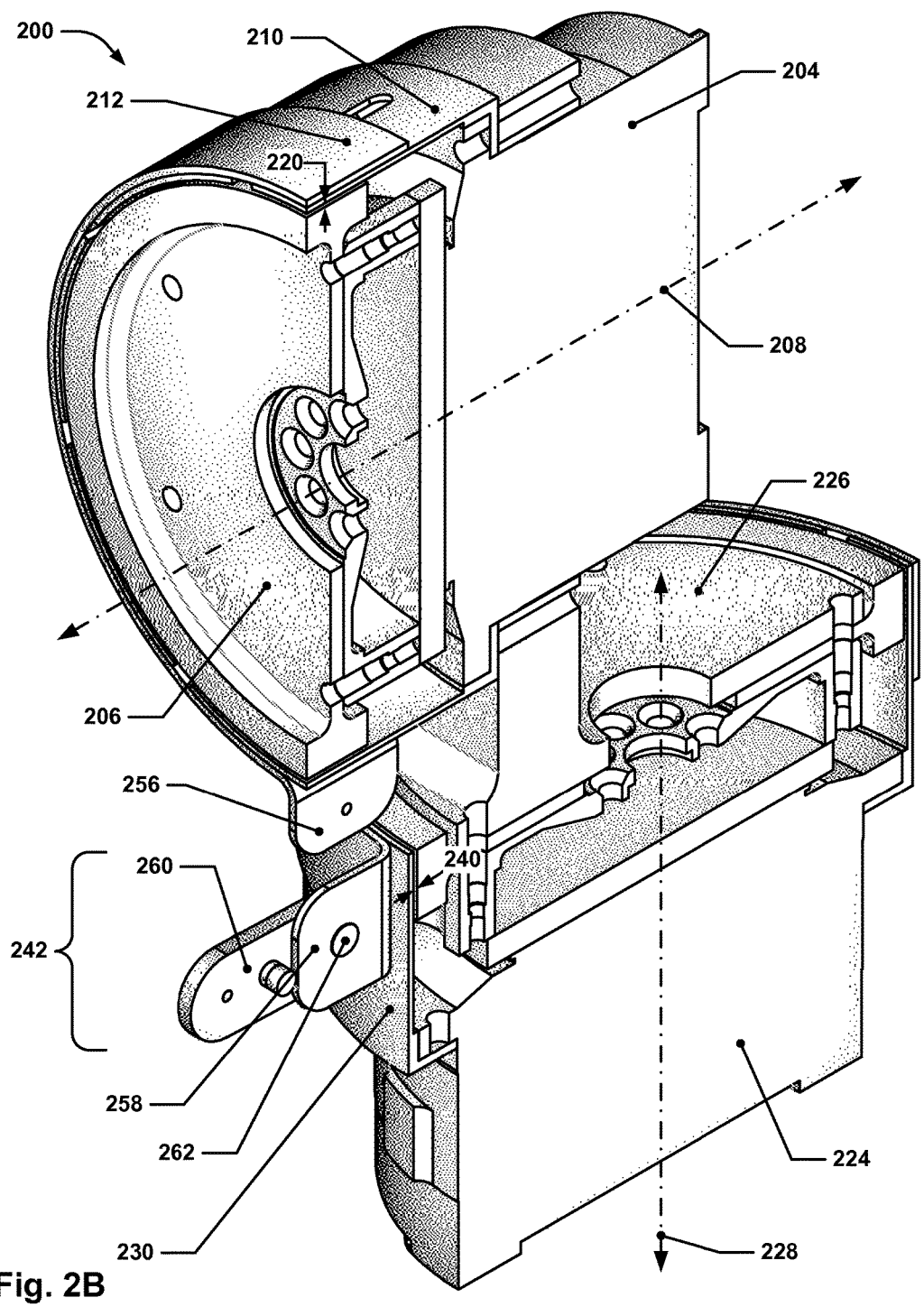
FIG. 2B depicts an isometric section view of the example positioning mechanism of FIG. 2A in an uncaged configuration.

FIG. 2B depicts an isometric section view of the example positioning mechanism of FIG. 2A in an uncaged or unclamped configuration. The various elements discussed above with respect to FIG. 2A are indicated, as are some additional elements not visible in FIG. 2A. For example, the bridging links 260 may be supported on a rotational spring mechanism 262 (which may be a pin that provides rotational motion, as shown, with a separate spring element (not shown), or which may be provided by a spring-loaded pin or shaft) that acts to rotate the bridging links 260 about the pin and away from the first tabs 256 when unloaded). In this manner, when the release device 242 is in a "released" state, the bridging links may rotate out of the way of the first tabs 256.

It is also to be understood that certain details are not included in the depiction shown. For example, the first base 204 and the second base 224 are both shown as having solid interiors, whereas in reality, both may include drive motors and gearing that provide for rotational movement between the first rotatable parts 206/second rotatable parts 226 and the first base 204/second base 224, respectively.

Also visible in FIG. 2B is first distance 220 and second distance 240. The first distance 220 may describe a gap (or lack thereof) that exists between first interior surfaces 218 (see FIG. 2D) of the first caging mechanism 210 and a first bearing surface 214 (also see FIG. 2D) of the first rotatable part 206. When the first caging mechanism 210 is in the unclamped configuration, as shown, the first distance 220 may typically be a non-zero amount, e.g., at least 0.001", and more preferably, at least 0.005". In FIGS. 2A and 2B, the first distance 220 and the second distance 240 are approximately 0.050".

Similarly, the second distance 240 may describe a gap (or lack thereof) that exists between second interior surfaces 238 (see FIG. 2D) of the second caging mechanism 230 and a second bearing surface 234 (also see FIG. 2D) of the second rotatable part 226. When the second caging mechanism 230 is in the unclamped configuration, as shown, the second distance 240 also may typically be a non-zero amount, e.g., at least 0.001", and more preferably, at least 0.005".

When the first distance 220 and the second distance 240 are non-zero amounts, this may (subject to the influence of assembly tolerances and other factors) allow the first rotatable part 206 to rotate with respect to the first base 204 without contact and the second rotatable part 226 to rotate with respect to the second base 224 without contact (or, at least, without contact of a magnitude high enough to prevent or appreciably hinder such rotations).

Figure 2C:
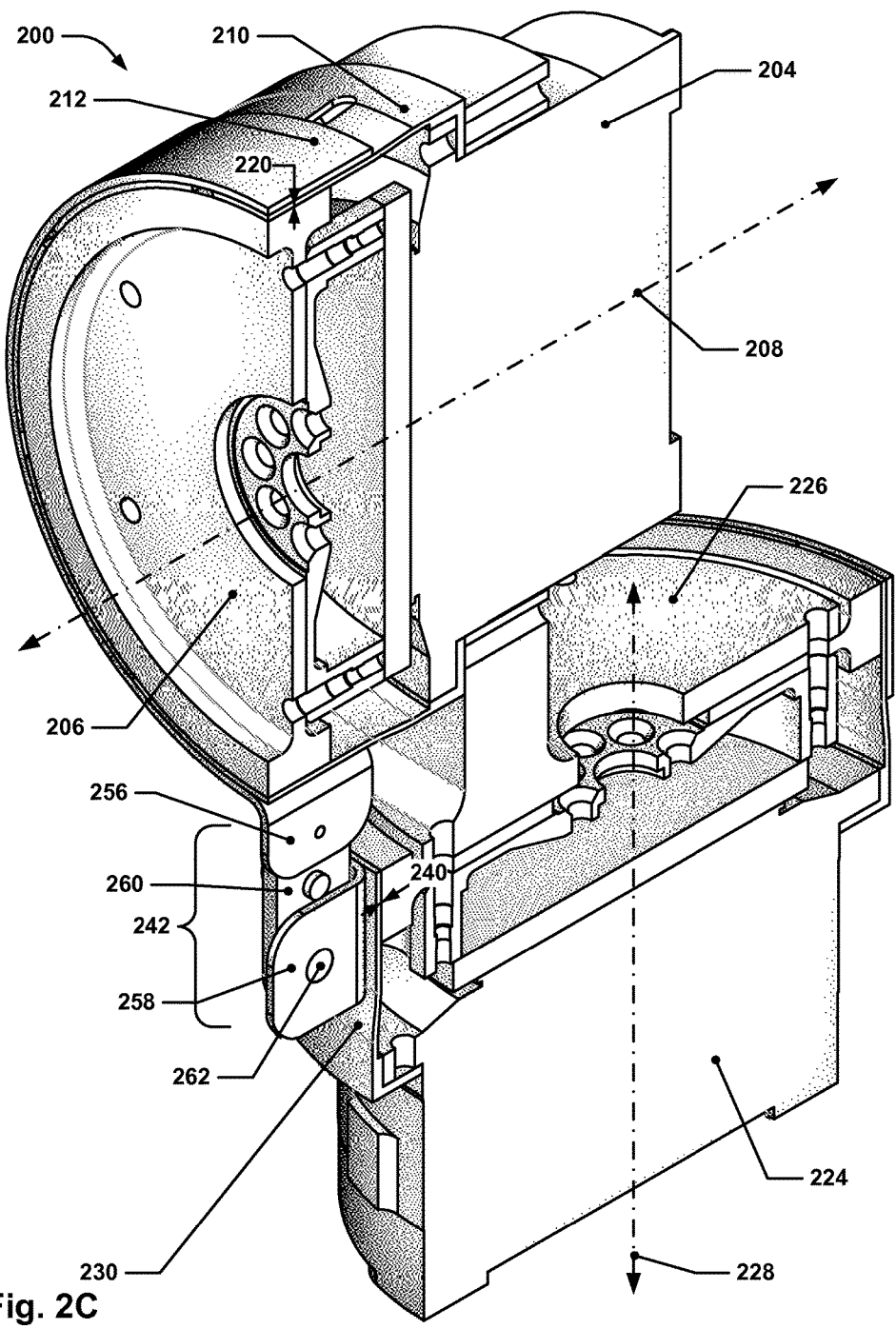
FIG. 2C depicts an isometric section view of the example positioning mechanism of FIG. 2A in a caged configuration.

FIG. 2C depicts an isometric section view of the example positioning mechanism of FIG. 2A in a caged configuration. FIG. 2C is largely identical to FIG. 2B, except that the first caging mechanism 210 and the second caging mechanism 230 have both been compressed into a clamped configuration by transitioning the first tensioning mechanism 212 into a first tensioned state and the second tensioning mechanism 232 into a second tensioned state, respectively. Such tensioning may be provided by tightening the release device 242 and drawing the bridging links 260 together (thus drawing the first tabs 256 together and the second tabs 258 together).

As can be seen, in the clamped configuration, the first distance 220 and the second distance 240 have been reduced to zero, i.e., the first interior surfaces 218/second interior surfaces 238 may be drawn into contact with the first bearing surface 214/second bearing surface 234, respectively. The first caging mechanism 210 and the second caging mechanism 230 may, when radially compressed by the first tensioning mechanism 212 and the second tensioning mechanism 232, flex slightly to allow for such contact (such flexure is subtle due to the small distances, e.g., 0.050", involved in FIG. 2C, but visible nonetheless).

Figure 2D:
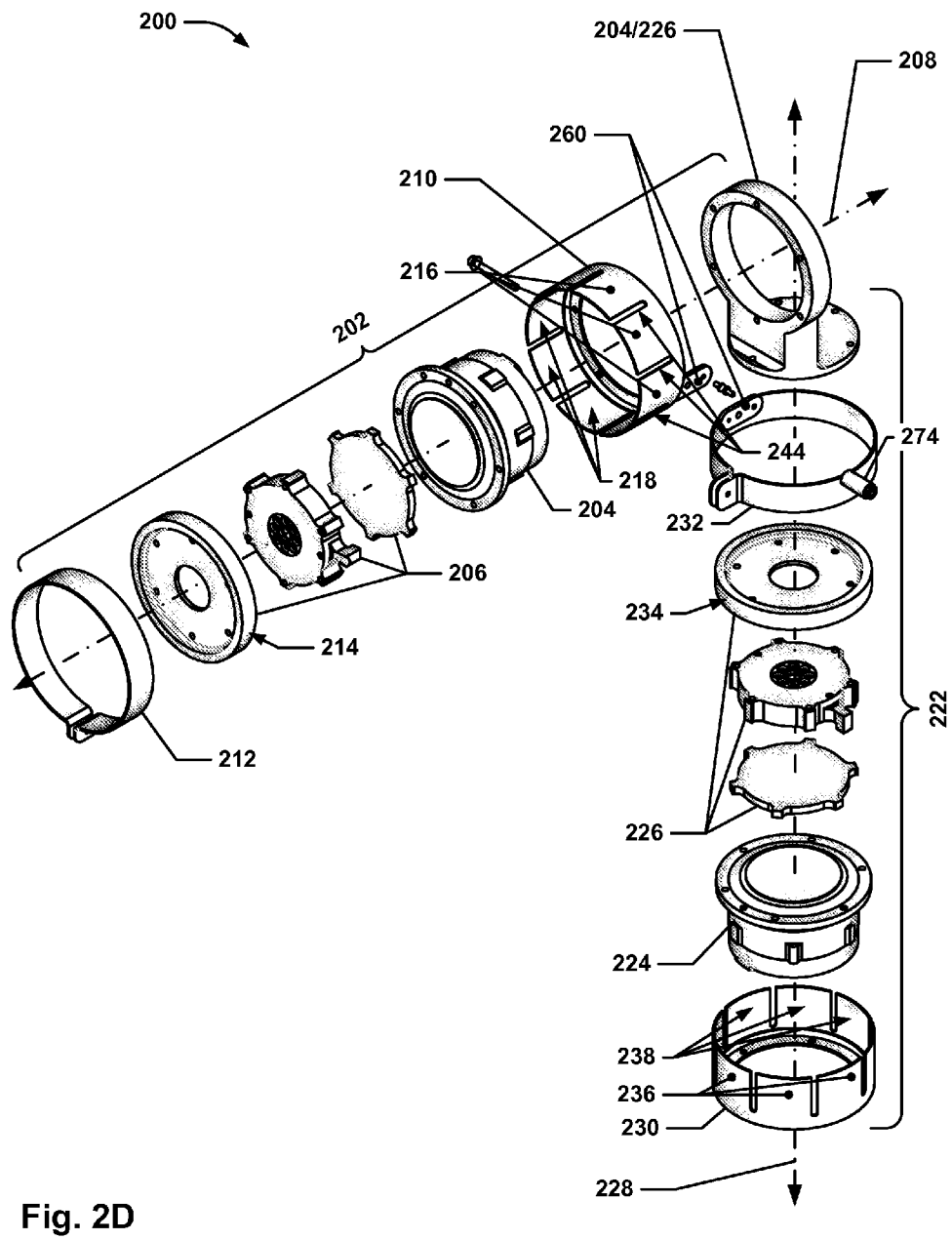
FIG. 2D depicts an isometric exploded view of the example positioning mechanism of FIG. 2A.

FIG. 2D depicts an isometric exploded view of the example positioning mechanism of FIG. 2A. As can be seen in FIG. 2D, the various parts and elements discussed above may be single components or formed from a plurality of subcomponents. For example, the first rotatable part 206 may be formed from three separate pieces that are all assembled together, e.g., via screws (fasteners not shown). The first bearing surface 214 is visible on one of these pieces. The second bearing surface 234 is similarly visible on one of the pieces forming the second rotatable part 226.

The first base 204 may, as shown, be provided by two separate pieces—a motor (left component) and a mounting bracket (right side). The mounting bracket portion of the first base 204 also serves as the second rotatable part 226, as indicated by the callout.

Also visible in FIG. 2D are further details of the first caging mechanism 210, including a radial array of slits 244 that may form a plurality of first segments 216, each first segment 216 located in between an adjacent pair of slits 244. Each first segment 216 may have a first interior surface 218. The second caging mechanism 230 may also have a radial array of slits 244 that define a plurality of second segments 236. Each second segment 236 may have a second interior surface 238.

In use, the first tensioning mechanism 212 and the second tensioning mechanism 232 may be tightened by tightening the release device 242 to place the first caging mechanism 210 and the second caging mechanism 230 in the clamped configuration. When it is desired that the positioning mechanism be released from the caged state, the release device 242 may be released, e.g., an actuator may be driven or an explosive bolt or other pyrotechnically-driven fastener may be severed, and the first caging mechanism 210 and the second caging mechanism 230 may, absent the compressive force provided by the first tensioning mechanism 212 and the second tensioning mechanism 232, expand to their unstressed states and thus revert to the unclamped configuration.

Figure 2F:
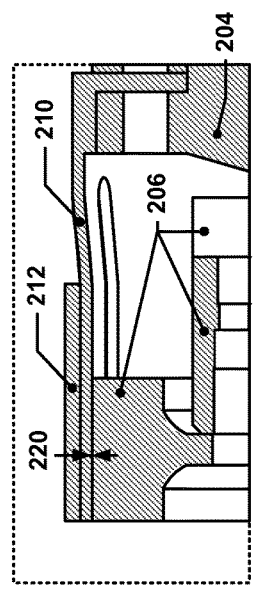
FIGS. 2E and 2F show sectional views of the example positioning mechanism of FIGS. 2B and 2C, respectively.
Figure 2F:
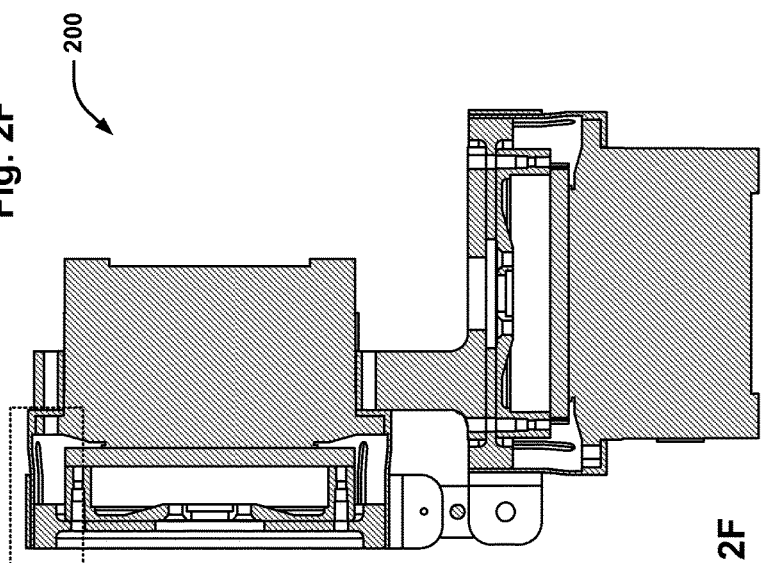
Figure 2E:
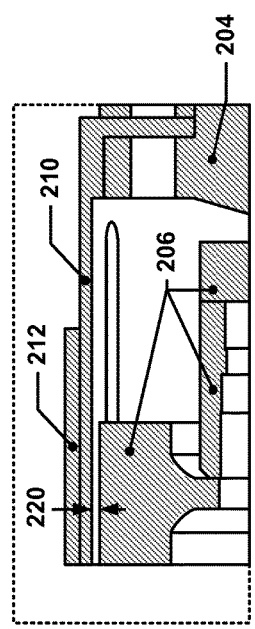
Figure 2E:
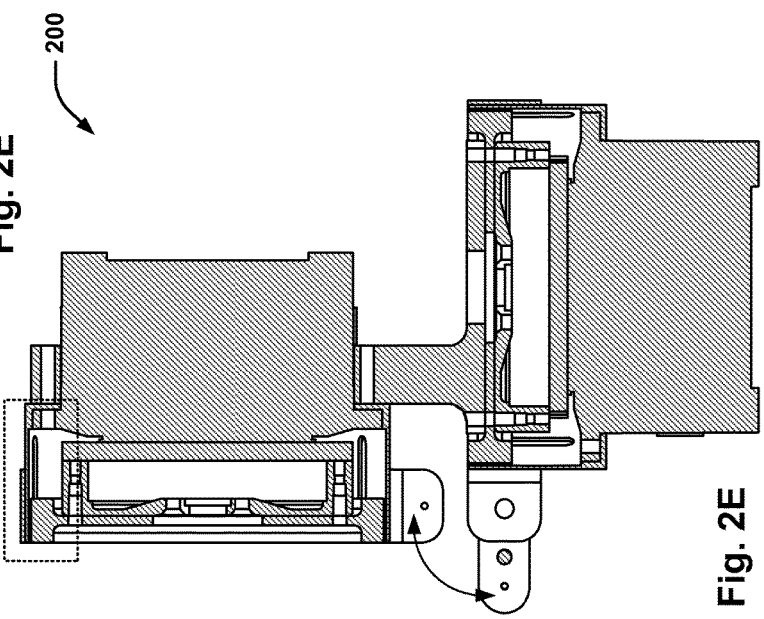

FIGS. 2E and 2F show sectional views of the positioning mechanism 200 of FIGS. 2B and 2C, respectively. FIGS. 2E' and 2F' are detail views of portions of FIGS. 2E and 2F. As can be seen, a minute gap is visible in FIG. 2E (the unclamped configuration) between the first caging mechanism 210 and the first bearing surface 214 and the second caging mechanism 230 and the second bearing surface 234 that is not visible in FIG. 2F (the clamped configuration).

Figures 3A, 3B:
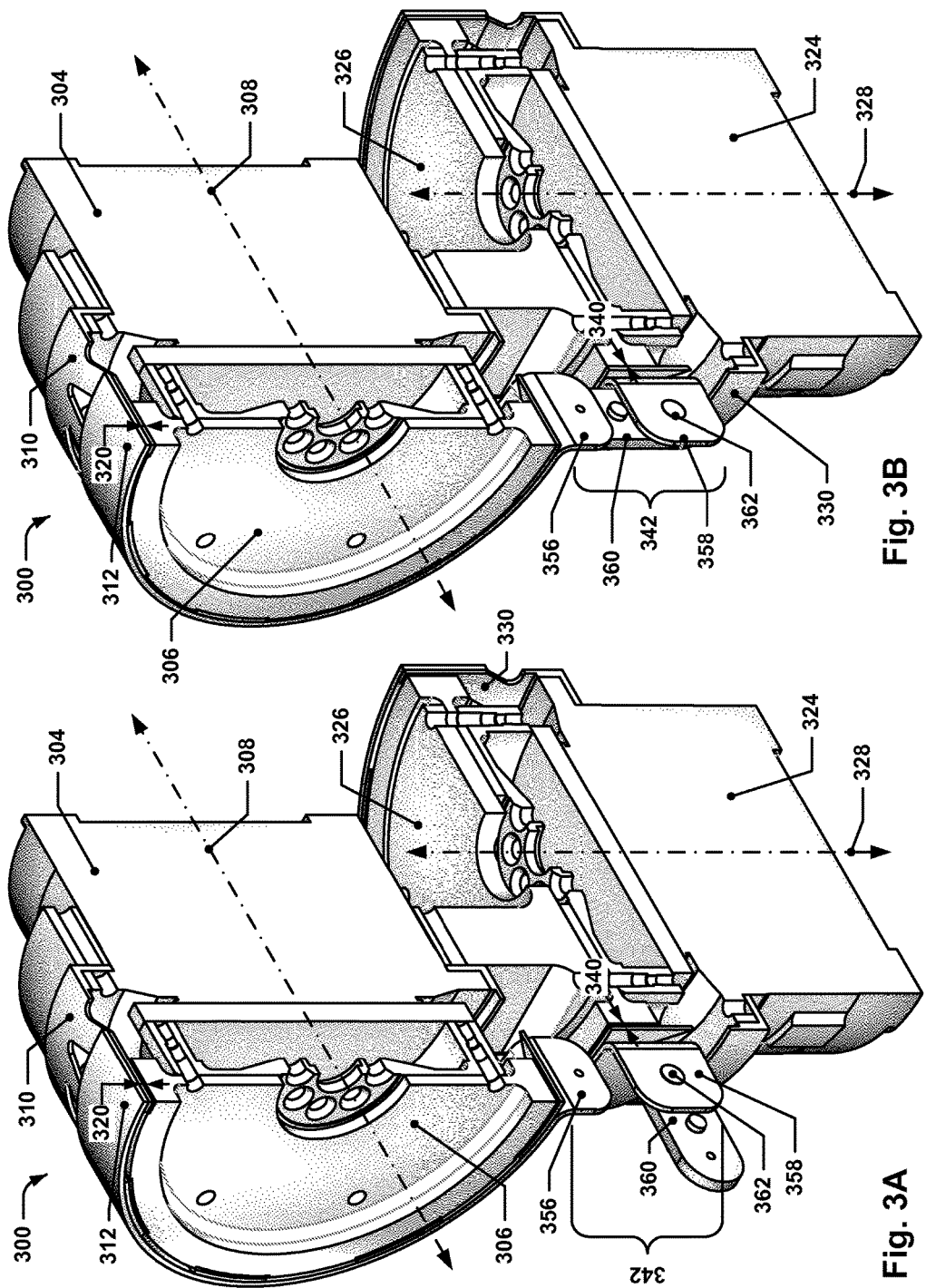
FIG. 3A depicts an isometric section view of another example positioning mechanism in an uncaged configuration.
FIG. 3B depicts an isometric section view of the example positioning mechanism of FIG. 3A in a caged configuration.
Figure 3C:
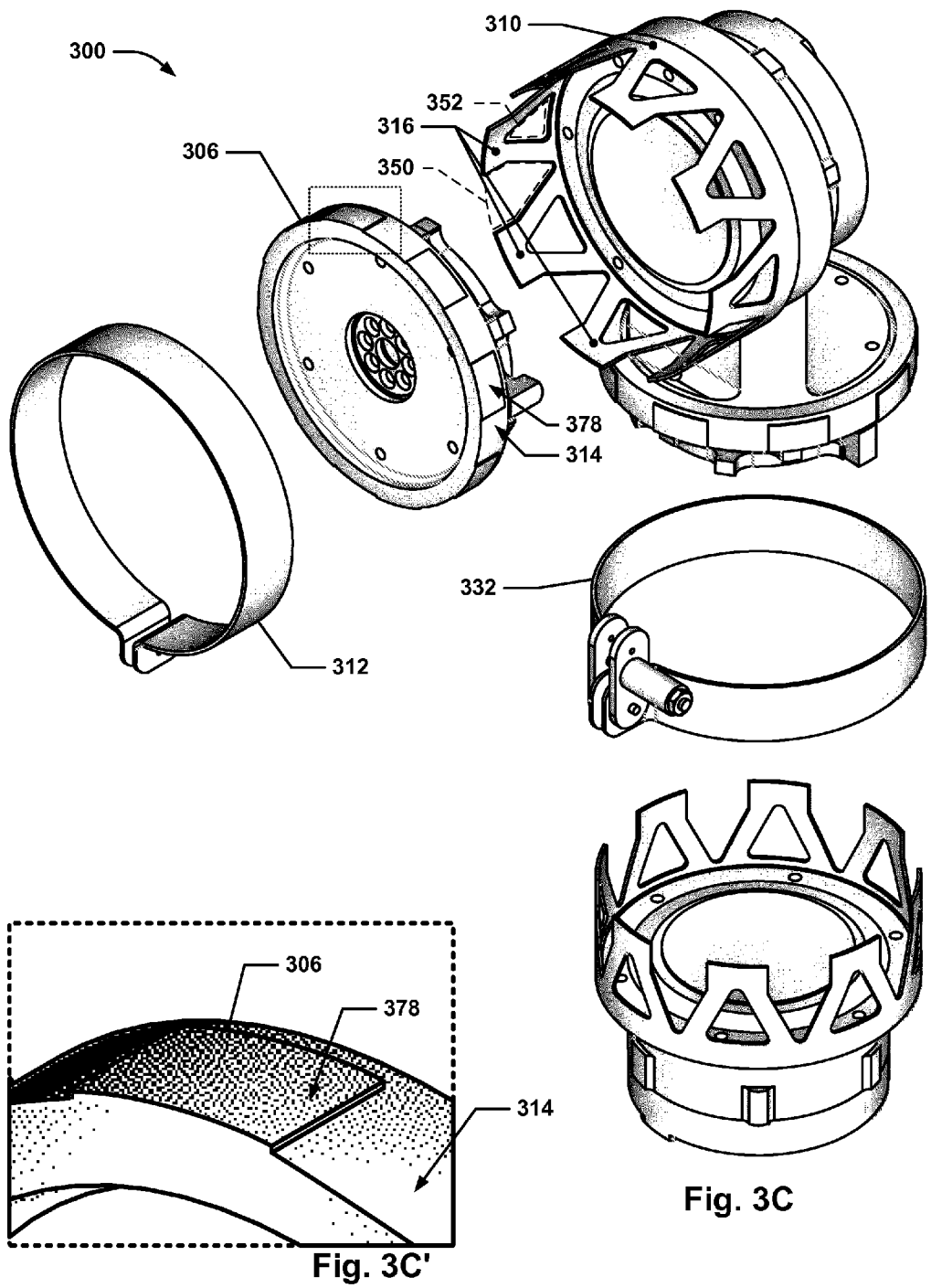
FIG. 3C depicts an isometric exploded view of the example positioning mechanism of FIG. 3A.

FIG. 3A depicts an isometric section view of another example positioning mechanism in an uncaged configuration. FIG. 3B depicts an isometric section view of the example positioning mechanism of FIG. 3A in a caged configuration. FIG. 3C depicts an isometric exploded view of the example positioning mechanism of FIG. 3A. FIG. 3C' depicts a detail view of a portion of FIG. 3C.

In FIGS. 3A through 3C, many of the components are similar to components in FIGS. 2A through 2F. Such similar components have numerical indicators that share the same last two digits as their equivalents in FIGS. 2A through 2F and are not, in the interest of avoiding the presentation of redundant material, re-described below. Unless the discussion below conflicts with such descriptions, the reader is directed to the earlier description of the elements of FIGS. 2A through 2F for descriptions of these components.

In FIGS. 3A through 3C, a first caging mechanism 310 and a second caging mechanism 330 are used that are somewhat similar to the first caging mechanism 210 and the second caging mechanism 230 of FIGS. 2A through 2F. However, instead of a radial array of slits 244, the first caging mechanism 310 and the second caging mechanism 330 may feature a radial array of substantially triangular first cutouts 350 (in this case, pentagrams with a rectangular base and a triangular top) and are somewhat crown-shaped. This may reduce flexural bending stiffness of the first segments 316 and the second segments 336 when radially compressed by the first tensioning mechanism 312 and the second tensioning mechanism 332, respectively. Additionally, substantially triangular second cutouts 352 may be used to remove material from within each first segment 316 and second segment 336, further reducing the transverse flexural spring stiffness of the first segments 316 and the second segments 336.

Another difference between the positioning mechanism 302 and the positioning mechanism 202 is that the first bearing surface 314 and the second bearing surface 334 may each have a radial array of raised segments 378 that may, when the first caging mechanism 310 and the second caging mechanism 330 are in the clamped configuration, be interposed between adjacent pairs of first segments 316 and adjacent pairs of second segments 336. The raised segments 378 may have a height less than the first distance and/or the second distance (not shown, but the reader is referred to the discussion of the first distance 220 and the second distance 240 provided previously for discussion of these distances) such that the first segments 316 and the second segments 336 may be free to rotate about the first rotational axis and the second rotational axis (not shown, but again, refer to discussion of FIGS. 2A through 2F), respectively, without colliding with the raised segments 378 when the first caging mechanism 310 and the second caging mechanism 330 are in the unclamped configuration. When the first caging mechanism 310 and the second caging mechanism 330 are in the clamped configuration, the raised segments 378 and the first segments 316 and the second segments 336 may interlock, providing a positive engagement between the first rotatable part 306 and the first caging mechanism 210 and the second rotatable part 326 and the second caging mechanism 230. This may provide even further stiffness to the positioning mechanism 300 when caged.

Figures 4A, 4B:
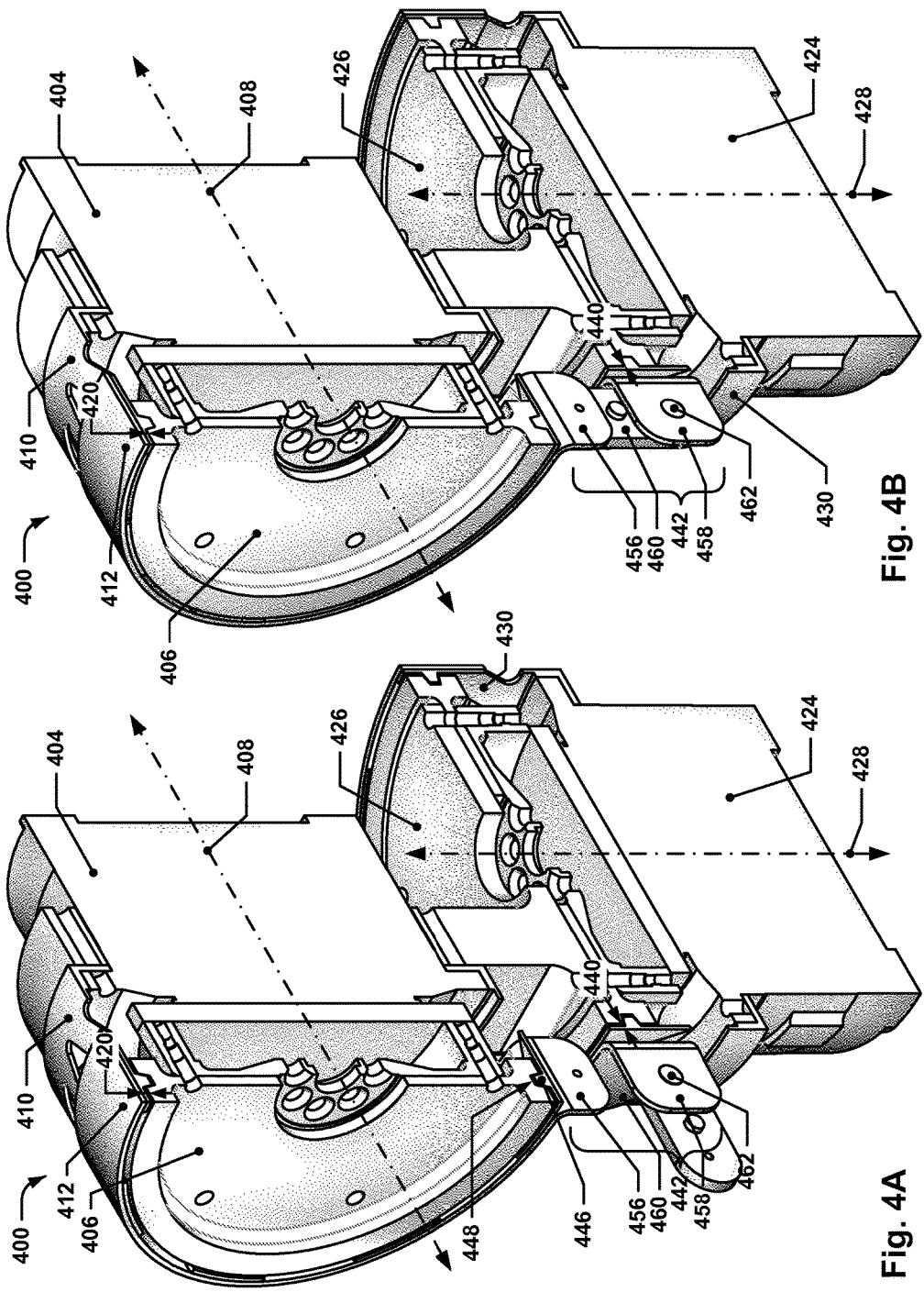
FIG. 4A depicts an isometric section view of another example positioning mechanism in an uncaged configuration.
FIG. 4B depicts an isometric section view of the example positioning mechanism of FIG. 4A in a caged configuration.
Figure 4C:
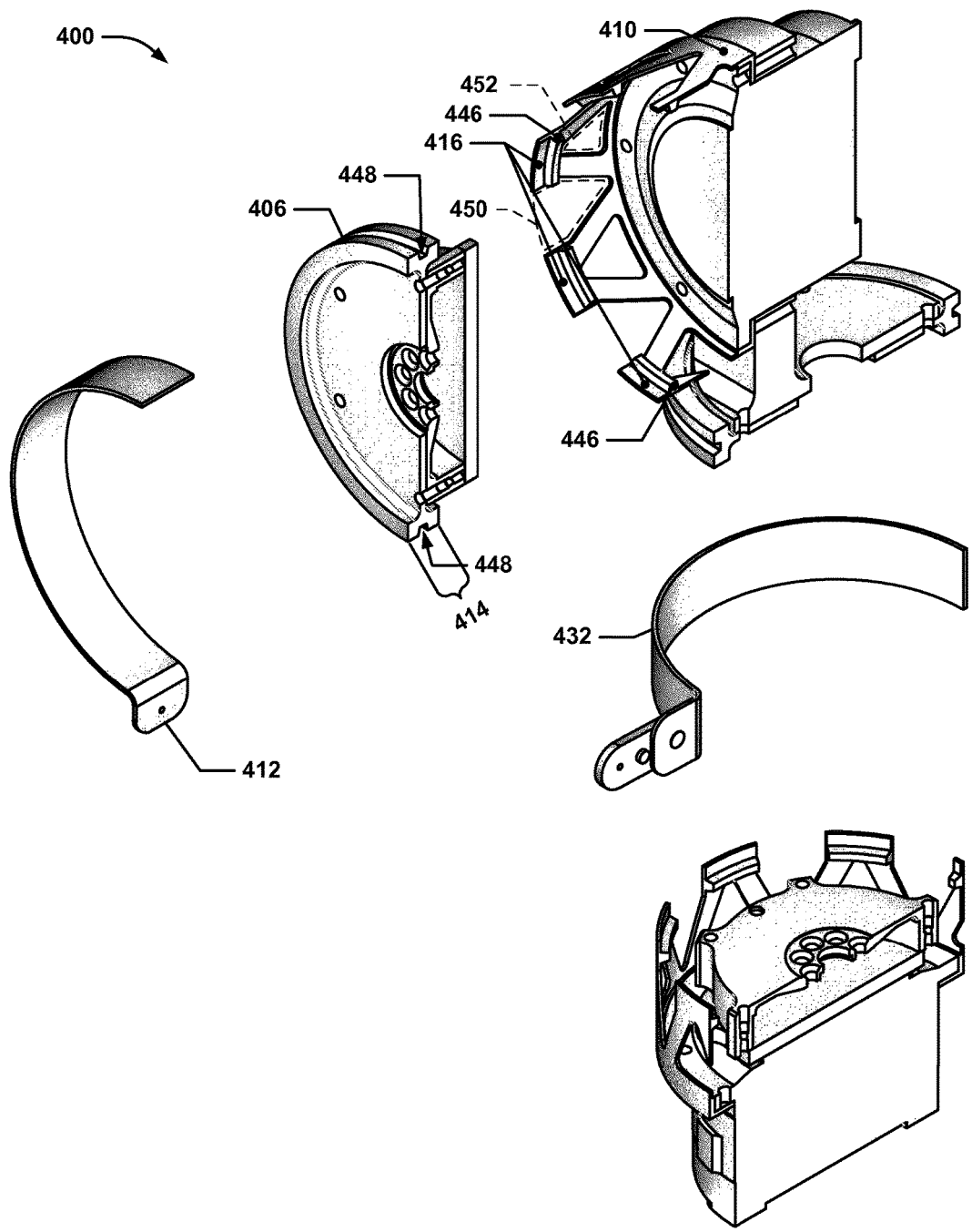
FIG. 4C depicts an isometric exploded view of the example positioning mechanism of FIG. 4A.

FIG. 4A depicts an isometric section view of another example positioning mechanism in an uncaged configuration. FIG. 4B depicts an isometric section view of the example positioning mechanism of FIG. 4A in a caged configuration. FIG. 4C depicts an isometric exploded view of the example positioning mechanism of FIG. 4A.

In FIGS. 4A through 4C, many of the components are similar to components in FIGS. 2A through 2F and 3A through 3C. Such similar components have numerical indicators that share the same last two digits as their equivalents in FIGS. 2A through 2F or 3A through 3C and are not, in the interest of avoiding the presentation of redundant material, re-described below. Unless the discussion below conflicts with such descriptions, the reader is directed to the description of the elements of FIGS. 2A through 2F and/or 3A through 3C for descriptions of these components.

The positioning mechanism 400 is very similar to the positioning mechanism 300, although there are some differences. For example, the first bearing surface 414 and the second bearing surface 434 do not feature the raised segments 378, but instead each feature a circumferential recessed portion 448, e.g., a groove. The first caging mechanism 410 and the second caging mechanism 430 also may have corresponding raised portions 446 that may, as shown, positively engage with the recessed portion 448 when the first caging mechanism 410 and the second caging mechanism 430 are in the clamped configuration. When the first caging mechanism 410 and the second caging mechanism 430 are in the unclamped configuration, then the raised portion 446 may be separated from the recessed portion 448 by the first distance 420 or the second distance 440, respectively. Such an arrangement may provide substantially more stiffness in the clamped configuration in bending transverse to the first rotational axis 408 or the second rotational axis 428 than may be achievable using an interface such as that shown in FIGS. 2A through 2F, i.e., where axial force is transferred between the first caging mechanism 210 and the first bearing surface 214 or the second caging mechanism 230 and the second bearing surface 234 by friction alone. It is to be understood that the recessed portion 448 may be located on the first caging mechanism 410 or the second caging mechanism 430, and the raised portion 446 may be located on the first bearing surface 414 and the second bearing surface 434, or combinations thereof.

Figure 5A:
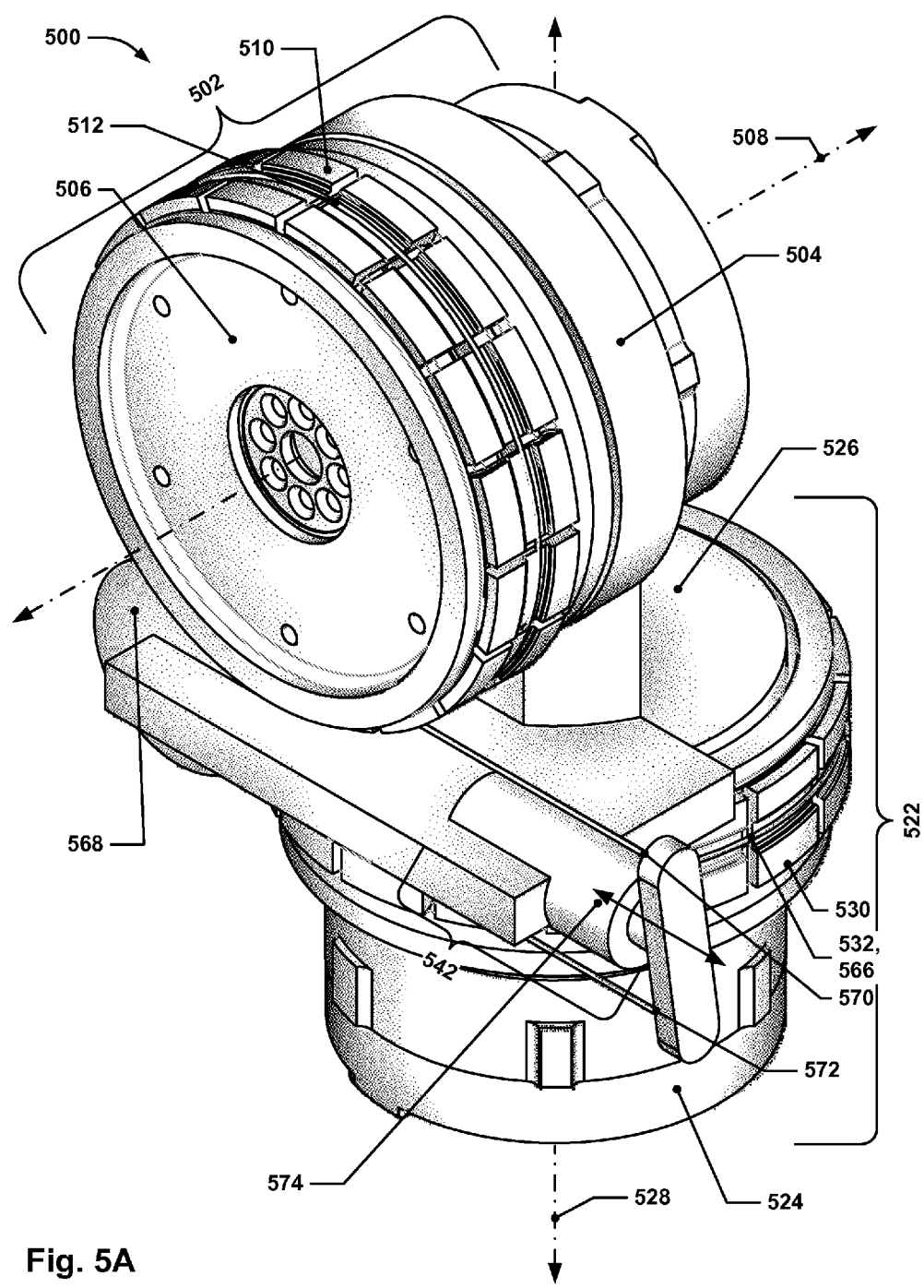
FIG. 5A depicts an isometric view of another example positioning mechanism.
Figure 5B:
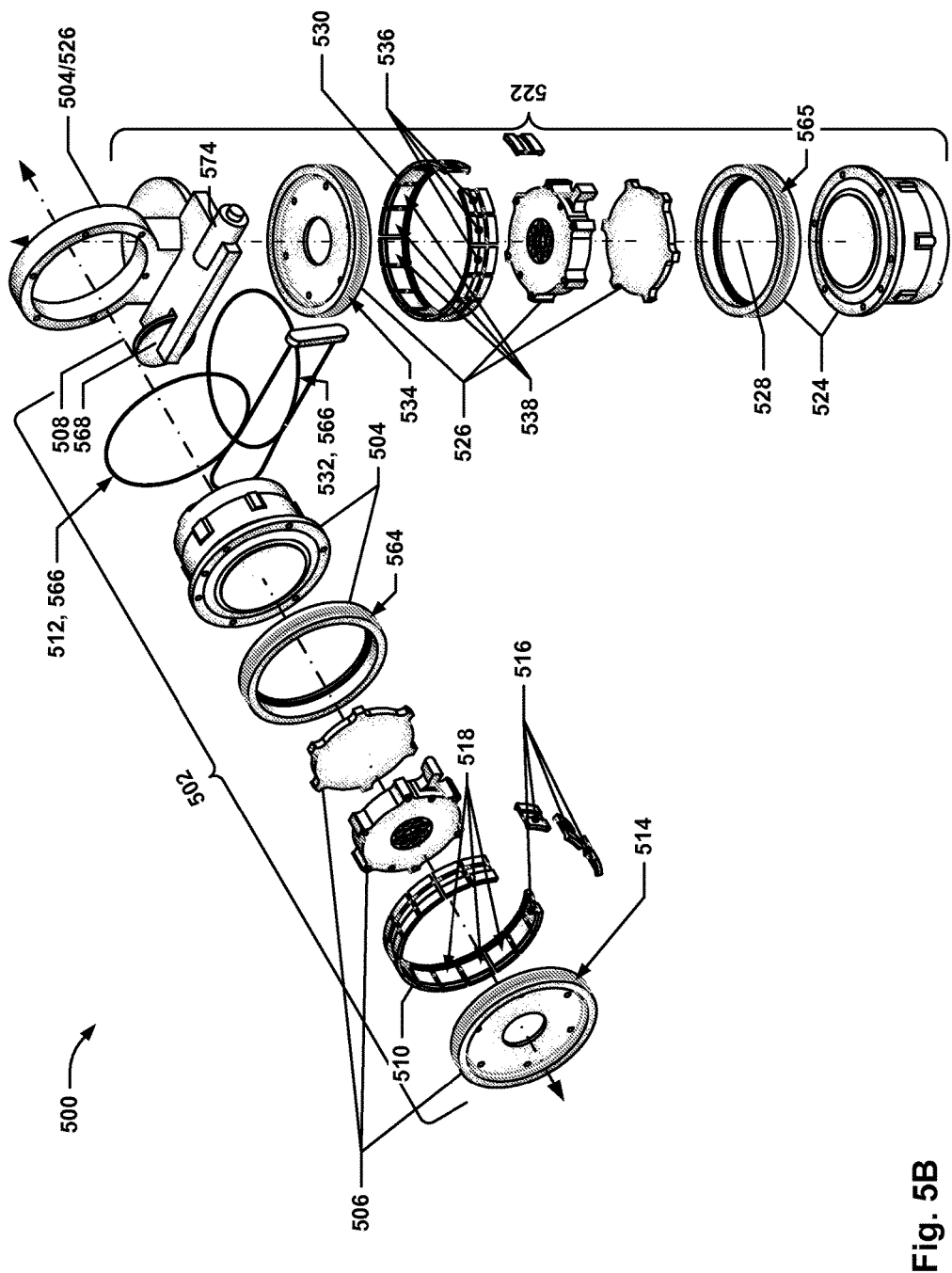
FIG. 5B depicts an isometric exploded view of the example positioning mechanism of FIG. 5A.

FIG. 5A depicts an isometric view of another example positioning mechanism. FIG. 5B depicts an isometric exploded view of the example positioning mechanism of FIG. 5A.

In FIGS. 5A through 5C, many of the components are similar to components in FIGS. 2A through 2F, 3A through 3C, and 4A through 4C. Such similar components have numerical indicators that share the same last two digits as their equivalents in FIGS. 2A through 2F, 3A through 3C, and 4A through 4C and are not, in the interest of avoiding the presentation of redundant material, re-described below. Unless the discussion below conflicts with such descriptions, the reader is directed to the description of the elements of FIGS. 2A through 2F and/or 3A through 3C for descriptions of these components.

In contrast to the positioning mechanisms 200, 300, and 400, the positioning mechanism 500 features a first caging mechanism 510 and a second caging mechanism 530 that are composed of discrete first segments 516 and discrete second segments 536. Such first segments 516 and second segments 536 may contact a first bearing surface 514 and a second bearing surface 534 when compressed, as with the first segments and the second segments of other implementations discussed previously. However, the first segments 516 and the second segments 536 may also contact a first base bearing surface 564 and a second base bearing surface 565 located on the first base 504 and the second base 524, respectively.

The positioning mechanism 500 is also different from the other positioning mechanisms discussed earlier in that the first tensioning mechanism 512 and the second tensioning mechanism 532 are both provided by a common cable 566, which may be wrapped around both groups of first segments 516 and second segments 536. By tensioning the common cable 566, the first segments 516 may cinch the first segments 516 into compressive contact with the first bearing surface 514 and the first base bearing surface 564 and may cinch the second segments 536 into compressive contact with the second bearing surface 534 and the second base bearing surface 565. In some such implementations, each individual segment may be clipped to the common cable to prevent the segments from floating free or falling out when in the unclamped configuration. Alternatively, a retaining ring may loosely retain the segments to prevent them from falling out or floating free (but still allowing the segments to easily move between the clamped configuration and the unclamped configuration.

In order to fully encircle the first segments 516 and the second segments 536 (in only one loop each), the common cable 566 may be passed over a common cable guide 568 that is located between the first caging mechanism 510 and the second caging mechanism 530. Furthermore, one or more of the free ends of the common cable 566 may be drawn away from the common cable guide 568 by the actuator 574. For example, one end of the common cable 566 may be connected to a first cable anchor point 570, and the other end of the common cable 566 may be connected to a second cable anchor point 572. The actuator 574 may, as shown, be configured to place the common cable 566 into tension (or to loosen the common cable 566), thus changing the compressive force exerted by the first segments 516 and the second segments 536 on the first bearing surface 514/ first base bearing surface 564 and the second bearing surface 534/second base bearing surface 565, respectively. In the example shown, both free ends of the common cable 566 are displaced together to effect such tensioning, although other implementations may feature only one free end of the common cable that may move to provide tensioning.

The above examples provide only some of the possible implementations that may be used to practice the concepts described herein. Other implementations of the concepts described herein are also considered to be within the scope of this disclosure.

For example, features of the various implementations discussed herein may be combined differently than as specifically disclosed. For example, the raised/recessed portions discussed with respect to FIGS. 4A through 4C may be implemented in combination with the raised segments discussed with respect to FIGS. 3A through 3C. Alternatively, a common cable tensioning system may be used in the implementations of FIGS. 2A through 4C instead of two separate band clamps. In such implementations, other features may be implemented as well to facilitate the use of the common cable, e.g., a release device configuration as shown in FIG. 5B, a common cable guide, and ridges/recesses on the first segments/second segments to help keep the common cable in the correct axial position on the first segments/ second segments.

Furthermore, it is to be understood that other variations on the particular implementations shown may also fall within the scope of this disclosure. For example, cutout shapes other than substantially triangular shapes may be used, e.g., square, rectangular, etc. Furthermore, while the caging mechanisms shown in FIGS. 2A through 4C have featured substantially uniform wall thicknesses, variable-thickness caging mechanisms may also be used. For example, a caging mechanism such as the first caging mechanism 210 may feature first segments 216 that have thinner wall thicknesses at the root, i.e., where the slits 244 stop, than at a point where the first segments contact the first bearing surface 214. This may allow the first segments to flex more easily for transitioning between the clamped configuration and the unclamped configuration.

It is also to be understood that the release device used may be a single-action device or a dual-action device. A single action device refers to a release device that is only capable of releasing the tensioning mechanisms that maintain the caging mechanisms in the clamped configuration in response to a signal. For example, with reference to FIGS. 2A through 2F, the release device 242 may include a bolt or other threaded fastener that may be tightened to draw the bridging links 260 together. The bolt may also pass through a shape-memory alloy (SMA) cylinder that may be placed in compression with the bridging links 260. When it is time to transition the first and second caging mechanisms from the clamped configuration to the unclamped configuration, the SMA cylinder may be heated up, e.g., by applying current to a heater coil wrapped around the SMA cylinder, causing the SMA cylinder to revert to a longer-length cylinder. This transition may cause the bolt to stretch and snap, thus releasing the compressive force on the bridging links and allowing the first/second caging mechanisms to revert to the uncaged configurations. Other examples of single-action release devices may include pyrotechnic actuators, or other irreversible mechanisms. While single-action release devices may still be able to transition the caging mechanisms into the clamped configuration, this capability generally requires manual operations by a person, e.g., tightening a nut on a bolt with a wrench or nut driver, and is not able to be remotely performed by sending an electrical signal to the release device.

A dual-action device refers to a release device that is capable of both releasing and engaging the tensioning mechanisms that place the caging mechanisms in the clamped configuration in response to a signal. For example, a linear actuator such as a paraffin actuator, screw drive, or other reversible actuator, may be used to impart bi-directional movement on the tensioning mechanisms. This may, for example, allow the tensioning mechanisms to be moved between two states such that the caging mechanisms move between the clamped configuration and the unclamped configuration and back again responsive to one or more signals sent to the release device. This may, for example, allow the positioning mechanism to be uncaged after launch and then re-caged after being moved into position, all in response to electrical or other controller-supplied signals (i.e., without manual interference by a human) to provide a deployed structure that is less susceptible to drift or slop.

It is also to be understood that, for multi-axis positioning mechanisms, each axis may be independently caged/uncaged if independent actuators are provided for tensioning/untensioning the tensioning mechanisms.

The materials used to manufacture the various components described herein may be selected from materials commonly used in spacecraft design, e.g., metals, such as aluminum, steel, titanium, and magnesium alloys, or non-metallic materials, e.g., composites. Harder materials, e.g., steel, may be used for the components that may contact one another, e.g., the caging mechanisms and the bearing surfaces.

The caging systems described herein may be used to replace one or more standoff-type anchors that are used to hold a deployable structure in place on a spacecraft. In many existing spacecraft, a standoff-type anchoring device may be placed near the positioning mechanism in order to support a deployable structure as an antenna reflector or propulsion module. Depending on the tolerances and placement of this standoff-type anchor (and other such anchors used), there may be a slight misalignment between a rotational axis of the positioning mechanism and the axis of the deployable structure that is typically coaxial with such a rotational axis. This may cause undesirable stress in the rotational bearing mechanism of the positioning mechanism. Through the use of caging mechanisms as described herein, such stresses may be avoided or reduced.

Moreover, the caging systems described herein may be applied to hardware, e.g., motors and bearings, currently used in existing positioning mechanisms without changing out components (such as the motors or bearings), resulting in no need to re-qualify such hardware for spaceflight. This is further facilitated by the fact that the caging mechanisms do not require any axial translation of the rotating parts with respect to the base parts in order to engage the caging mechanisms.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. A positioning mechanism comprising:
   a first rotational joint with a first base and a first rotatable part rotationally coupled with the first base via a first rotational bearing mechanism, the first rotatable part configured to rotate about a first rotational axis with respect to the first base; and
   a first caging mechanism configured to transition from a clamped configuration to an unclamped configuration, wherein:
      the first caging mechanism is separate from the first rotational bearing mechanism of the first rotational joint,
      the first caging mechanism, in the clamped configuration, contacts the first base and contacts the first rotatable part with sufficient radial clamping force to prevent the first rotatable part from rotating with respect to the first base,
      the first caging mechanism is configured, in the unclamped configuration, to avoid contact with the first rotatable part, and
      the positioning mechanism is configured to transition between the clamped configuration and the unclamped configuration while keeping the first base and the first rotatable part at a constant offset from one another along the first rotational axis.

2. The positioning mechanism of claim 1, further comprising:
   a first tensioning mechanism that is configured to maintain the first caging mechanism in the clamped configuration; and
   a release device, the release device configured to releasably maintain the first tensioning mechanism in a first tensioned state to hold the first caging mechanism in the clamped configuration, wherein:
      the first caging mechanism transitions to the unclamped configuration when the first tensioning mechanism is released from the first tensioned state,
      the first rotatable part includes a substantially radially-symmetric first bearing surface, and
      the first caging mechanism includes a plurality of first segments arrayed about the first bearing surface such that each first segment has a first interior surface that is offset from the first bearing surface by a first distance when the first caging mechanism is in the unclamped configuration and the first interior surface of each first segment contacts the first bearing surface when the first caging mechanism is in the clamped configuration.

3. The positioning mechanism of claim 2, further comprising:
a second rotational joint with a second base and a second rotatable part rotationally coupled with the second base via a second rotational bearing mechanism, the second rotatable part configured to rotate about a second rotational axis with respect to the second base, wherein the first rotational axis is parallel to a reference axis that is orthogonal to the second rotational axis; and
a second caging mechanism configured to transition from a clamped configuration to an unclamped configuration, wherein:
the second caging mechanism is separate from the second rotational bearing mechanism of the second rotational joint,
the second base is fixed with respect to the first rotatable part,
the second caging mechanism, in the clamped configuration, contacts the second base and contacts the second rotatable part with sufficient radial clamping force to prevent the second rotatable part from rotating with respect to the second base,
the second caging mechanism, in the unclamped configuration, does not contact the second rotatable part with sufficient clamping force to prevent the second rotatable part from rotating with respect to the second base, and
the positioning mechanism is further configured to transition between the clamped configuration and the unclamped configuration while keeping the second base and the second rotatable part at a constant offset from one another along the second rotational axis.

4. The positioning mechanism of claim 3, wherein the positioning mechanism is a dual-axis positioning mechanism for use on spacecraft deployable appendage assemblies.

5. The positioning mechanism of claim 3, further comprising:
a second tensioning mechanism that is configured to maintain the second caging mechanism in the clamped configuration, wherein:
the release device is further configured to releasably maintain the second tensioning mechanism in a second tensioned state,
the second caging mechanism transitions to the unclamped configuration when the second tensioning mechanism is released from the second tensioned state,
the second rotatable part includes a substantially radially-symmetric second bearing surface, and
the second caging mechanism includes a plurality of second segments arrayed about the second bearing surface such that each second segment has a second interior surface that is offset from the second bearing surface by a second distance when the second caging mechanism is in the unclamped configuration.

6. The positioning mechanism of claim 5, wherein the release device is configured to release both the first tensioning mechanism and the second tensioning mechanism responsive to a common signal.

7. The positioning mechanism of claim 2, wherein the first caging mechanism comprises a thin-wall tube with a radial array of slits in one end, wherein the first segments are located between each pair of adjacent slits.

8. The positioning mechanism of claim 7, wherein the thin-wall tube is fixed with respect to the first base.

9. The positioning mechanism of claim 2, wherein:
each of the first interior surfaces has a first cross-sectional profile in a first reference plane coincident with the first rotational axis and intersecting the first interior surface,
the first bearing surface has a second cross-sectional profile in the first reference plane,
the first cross-sectional profile includes a portion that is raised or recessed with respect to a neighboring portion or portions of the first cross-sectional profile,
the second cross-sectional profile includes a portion that is recessed or raised with respect to a neighboring portion or portions of the second cross-sectional profile, and
the recessed or raised portion, respectively, of the first cross-sectional profile engages with the raised or recessed portion, respectively, of the second cross-sectional profile when the first caging mechanism is in the clamped configuration.

10. The positioning mechanism of claim 2, wherein the first distance is at least 0.001" to 0.010".

11. The positioning mechanism of claim 7, wherein the first caging mechanism further includes a radial array of cutouts, each cutout located within one of the first segments.

12. The positioning mechanism of claim 7, wherein the thin-wall tube has a wall thickness at the first segments that is between about 0.005" and 0.100".

13. The positioning mechanism of claim 2, wherein the first tensioning mechanism comprises a first tensioning strap that is wrapped around the first segments and positioned such that the first segments are drawn into contact with the first bearing surface when the first tensioning strap is tightened.

14. The positioning mechanism of claim 2, wherein:
the first caging mechanism comprises a thin-wall tube with a radial array of substantially triangular first cutouts in one end, and
the first segments are located between each pair of adjacent triangular first cutouts.

15. The positioning mechanism of claim 14, wherein:
the first bearing surface includes a radial array of raised segments offset from the first bearing surface in a radial direction by an amount less than the first distance, and
in the clamped configuration, the first segments are each located between pairs of the raised segments.

16. The positioning mechanism of claim 14, wherein:
the first caging mechanism further includes a radial array of substantially triangular second cutouts,
the triangular second cutouts are oriented approximately 180° with respect to the first triangular cutouts, and
each first triangular cutout is located within a first segment.

17. The positioning mechanism of claim 2, wherein:
the first segments are discrete components that, when radially arrayed, form a substantially tubular structure that surrounds the first bearing surface, and
the first interior surfaces have a radius of curvature that corresponds with a radius of curvature of the first bearing surface.

18. The positioning mechanism of claim 17, further comprising a substantially radially-symmetric first base bearing surface located on the first base, wherein the first caging mechanism contacts both the first bearing surface and the first base bearing surface when in the clamped configuration.

19. The positioning mechanism of claim 2, wherein:
the release device is configured to transition between an open state and a closed state,
the release device draws the first tensioning mechanism into the first tensioned state when transitioned to the closed state, and
the release device releases the first tensioning mechanism from the first tensioned state when transitioned to the open state.

20. The positioning mechanism of claim 19, wherein the release device includes an actuator to transition the release device back and forth between the open state and the closed state.

21. The positioning mechanism of claim 5, wherein the first tensioning mechanism and the second tensioning mechanism are provided in part by a common cable that is wrapped around both the first segments of the first caging mechanism and the second segments of the second caging mechanism.

22. The positioning mechanism of claim 21, wherein the first tensioning mechanism and the second tensioning mechanism are provided in further part by:
a common cable guide;
a first cable anchor point; and
a second cable anchor point, wherein:
the common cable guide includes a contact surface configured to contact a portion of the common cable spanning between the first caging mechanism and the second caging mechanism,
a first end of the common cable is connected to the first cable anchor point,
a second end of the common cable is connected to the second cable anchor point, and
the release device is configured to change the distance between the contact surface and at least one of the first cable anchor point and the second cable anchor point.

23. The positioning mechanism of claim 5, wherein:
the first tensioning mechanism includes a) a first tensioning strap that is wrapped around the first segments and positioned such that the first segments are drawn into contact with the first bearing surface when the first tensioning strap is tightened and b) first tabs that extend away from the first tensioning strap in a substantially radial direction,
the second tensioning mechanism includes a) a second tensioning strap that is wrapped around the second segments and positioned such that the second segments are drawn into contact with the second bearing surface when the second tensioning strap is tightened and b) second tabs that extend away from the second tensioning strap in a substantially radial direction,
the first tabs and the second tabs are aligned with one another when the first caging mechanism and the second caging mechanism are both in the clamped configuration,
the release device includes at least two bridging links that span between the first tabs and the second tabs,
the first tabs and the second tabs are interposed between the at least two bridging links, and
the release device is configured to draw the first tensioning mechanism into the first tensioned state and the second tensioning mechanism into the second tensioned state by drawing the at least two bridging links together.

24. The positioning mechanism of claim 23, wherein:
the release device further includes a spring mechanism configured to cause the at least two bridging links to rotate clear of the area where the first tabs travel when the first tensioning mechanism is rotated about the first rotational axis.

* * * * *